United States Patent
Fano et al.

(10) Patent No.: US 8,428,618 B2
(45) Date of Patent: Apr. 23, 2013

(54) MOBILE VALET

(75) Inventors: Andrew E. Fano, Lincolnshire, IL (US); Scott W. Kurth, Wheeling, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 13/441,312

(22) Filed: Apr. 6, 2012

(65) Prior Publication Data
US 2012/0196626 A1  Aug. 2, 2012

Related U.S. Application Data

(63) Continuation of application No. 11/250,517, filed on Oct. 14, 2005, now Pat. No. 8,180,364, which is a continuation of application No. 10/101,240, filed on Mar. 19, 2002, now Pat. No. 6,957,393.

(60) Provisional application No. 60/277,347, filed on Mar. 19, 2001, provisional application No. 60/281,038, filed on Apr. 2, 2001.

(51) Int. Cl.
H04W 24/00 (2009.01)

(52) U.S. Cl.
USPC ............... 455/456.1; 455/414.4; 455/450; 455/456.2; 455/517; 709/202; 709/229; 709/217; 709/225; 709/226; 715/748; 715/962; 370/259; 370/401; 370/465

(58) Field of Classification Search ............... 455/414.4, 455/450, 456.1, 517; 709/202, 229, 217, 709/225, 226; 715/748, 962; 370/259, 401, 370/465
See application file for complete search history.

(56) References Cited

U.S. PATENT DOCUMENTS

| | | | |
|---|---|---|---|
| 6,760,770 B1 * | 7/2004 | Kageyama | 709/229 |
| 7,158,511 B2 * | 1/2007 | Payton | 370/389 |

* cited by examiner

*Primary Examiner* — Amancio Gonzalez
(74) *Attorney, Agent, or Firm* — Brinks Hofer Gilson & Lione

(57) ABSTRACT

A system provides location-based services through an enhanced mobile device. The system determines a current location of the mobile device, and determines whether the current location of the mobile device falls within one or more geographic regions defined in a database. If the current location falls within one or more of the geographic regions, the system identifies services available within the one or more geographic regions that the mobile device is determined to be within. The system generates a customized menu based on the identified services and displays the customized menu on the mobile device.

20 Claims, 8 Drawing Sheets

MOBILE VALET

This application is a continuation of U.S. patent application Ser. No. 11/250,517, filed Oct. 14, 2005, which is a continuation of U.S. patent application Ser. No. 10/101,240, filed Mar. 19, 2002, now U.S. Pat. No. 6,957,393, which claims benefit of U.S. provisional application No. 60/277,347 filed Mar. 19, 2001, and U.S. provisional application No. 60/281,038 filed Apr. 2, 2001, all of which are incorporated herein by reference.

BACKGROUND

The present invention relates generally to applications for wireless devices. More particularly, the present invention relates to methods and systems for enriching services provided in cooperation with wireless mobile devices Increases in information processing capability and decreases in the cost of computing have led to the proliferation of mobile devices in all aspects of society. Mobile devices, such as personal digital assistants, cellular phones, and laptops, are utilized in schools, homes and in business. Furthermore, with the decreased costs of mobile devices, it has become more feasible from a cost perspective to use mobile devices for tasks, and to carry out functions, which were previously done without the use of mobile devices.

Already, there are almost 400 million mobile phone users, with the number projected to reach over one billion by 2005. Globally, 240 million people are predicted to use their phones for wireless data exchange by the end of 2004—up from 26 million in 1999.

Even with these astounding numbers, however, there is one inescapable fact: by far, the worst display screen in the room is likely to be the one on a mobile phone or personal digital assistant. Mobile devices have small display screens, limited sound amplification, and, presently, limited connectivity or bandwidth. Delivering more information, in higher fidelity, using these tiny displays, will be difficult at best.

This is not to say that industry has not attempted to improve consumers' usage of these mobile devices. For example, there are new ways in which technologies such as PDAs, wireless communications, GPS, and onboard computers can be used to provide new services centered around the automobile in support of the tasks that drivers typically engage in. Mobile technology may also be used in support of physical shopping to augment the physical shopping experience of a shopper in a mall. For example, using a PDA equipped with a global positioning system (GPS) receiver, one application maintains a profile of the shopper along with a current shopping list, and after establishing the current location of the shopper, presents relevant offers from retailers proximate to the shopper, which is described by A. Fano in U.S. Pat. No. 6,317,718, filed Feb. 26, 1999, which is incorporated herein by reference. It has also been suggested that barcode scanner equipped PDAs could be used to perform live price comparisons within a bookstore.

Nevertheless, these uses of PDA's still are limited to providing services to the user through the PDA display. What is needed is a method and system that can deliver context-based enhanced services to a user that go beyond the limitations of the display on the mobile device.

SUMMARY OF THE INVENTION

A system provides location-based services through an enhanced mobile device. The system determines a current location of the mobile device, and determines whether the current location of the mobile device falls within one or more geographic regions defined in a database. If the current location falls within one or more of the geographic regions, the system identifies services available within the one or more geographic regions that the mobile device is determined to be within. The system generates a customized menu based on the identified services and displays the customized menu on the mobile device.

These and other aspects and advantages of the invention will be apparent to one of ordinary skill in the art based on the following drawings and detailed description.

Figure 1:
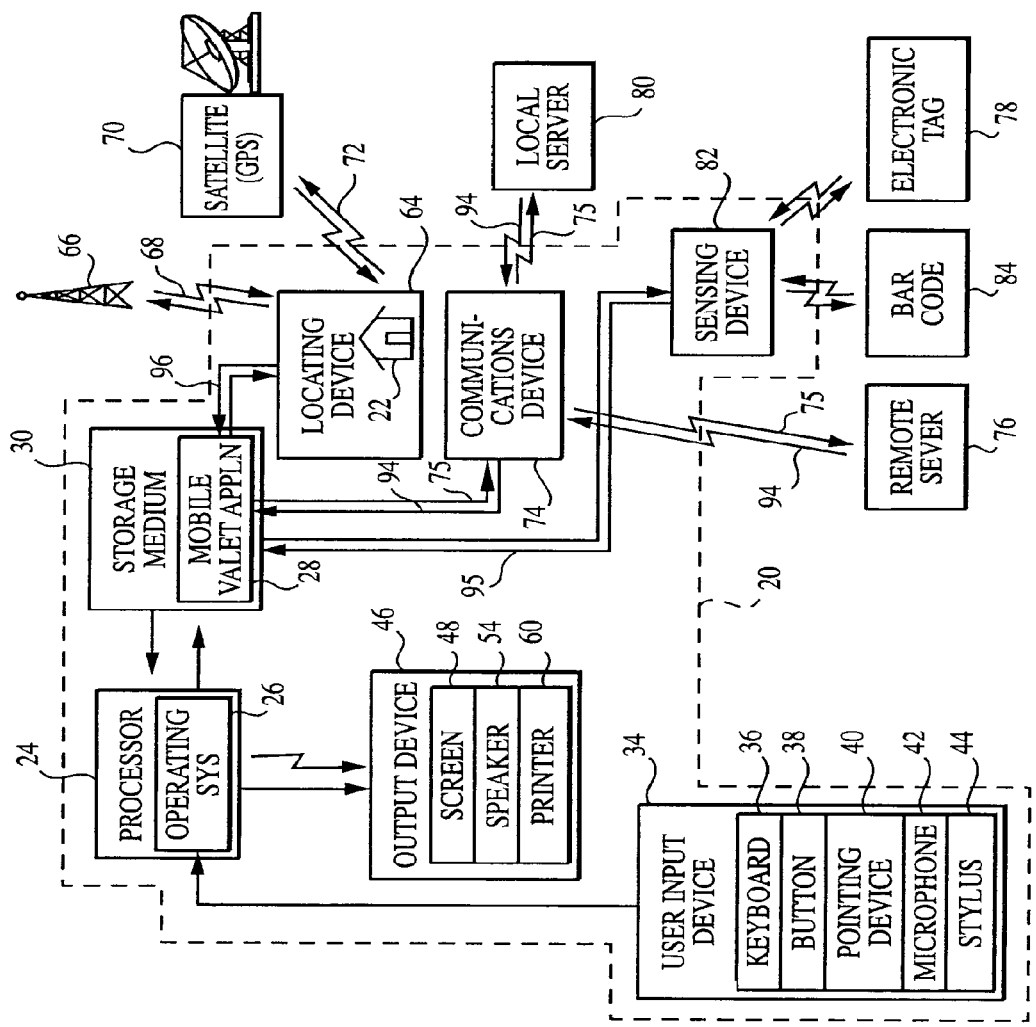
FIG. 1 is a block diagram of a system utilizing the present invention, according to one preferred embodiment.

For simplicity and clarity of illustration, elements shown in the Figures have not necessarily been drawn to scale. For example, dimensions of some elements are exaggerated relative to each other. Further, when considered appropriate, reference numerals have been repeated among the Figures to indicate corresponding elements.

DETAILED DESCRIPTION OF THE PRESENTLY PREFERRED EMBODIMENTS

A first aspect of the present invention is directed to delivering services to a user of a mobile device through a plurality of service channels. These channels include the personal service channel on the mobile device and one or more channels situated in the location of the user. Preferably, services may be shifted between available service channels in proximity to the user.

A second aspect of the invention is directed to context-based user interface templates on the mobile device that provides a common array of services available to the user depending on the context, such as location, task or function that may be based-in-part on environmental cues. For example, when in a store, services related to the task of shopping at that location are presented on the user interface.

A third aspect of the invention is directed to enabling the cooperation between remote service providers and location service providers to provide through a plurality of service channels those services desirable to a user based on the services requested through the user's mobile device or based on the user's profile.

A fourth aspect of the invention is directed to managing the flow of information from a plurality of remote service providers through a plurality of location service channels by aggregating the service channels for bulk transactions with the remote service providers.

A fifth aspect of the invention is directed to tracking the services provided to a mobile device user at a first location and compensating the first location service provider for providing those services if the user later completes a transaction at a second location when the transaction was connected with the services provided at the first location.

A sixth aspect of the invention is directed to a mobile device having wireless connectivity, remote sensors, location pinpointing system, and computer-executable instructions for requesting services through a plurality of service channels.

These alternative aspects of the invention, and others, are described in more detail below.

The present invention leverages wireless capabilities and the technology infrastructure of a location to create, among other things, a newly empowered mobile tool, a "Mobile Valet" device, capable of delivering the most appropriate services for any given location, on the best available channel. In the context of a shopping experience, this invention can catapult what has been termed "Mobile Commerce" to new levels.

The true potential of Mobile Commerce is realized when one goes beyond what can be done just on a phone or Personal Digital Assistant—delivering services by enabling and exploiting interaction between mobile devices and the world around us. Kiosks, displays, cars, appliances and other devices are rapidly acquiring wireless capabilities. Mobile devices may incorporate a variety of sensing capabilities, including location, barcodes, sound, video and radio frequency identification. One can point a Mobile Valet device to a myriad of objects with ID tags and receive supporting services.

In effect, the mobile device becomes a new user interface. Mobile capabilities operating in concert with the resources of a location may deliver far richer services, than the stripped down web pages delivered to phones and PDAs today.

The present invention takes advantage of the cooperation of a mobile device to support location-specific tasks by exploiting three primary capabilities:

First, the mobile device is a persistent, rich channel to an individual. That is, the device serves as a way to deliver services or information to the individual. Customer services can deliver the right information at the right time rather than broadcast random ads at uninterested masses.

Second, mobile devices serve as user context detectors. Mobile devices not only contain information about the owner such as personal information, schedule, task-specific data, but also sensors capable of detecting aspects of the user's environment. The system includes real-time architecture that derives contextual cues from sensor data. Such sensors might detect features including position, sound, video, temperature, and location contents, among others. These "bottom-up" contextual cues combined with the "top-down" constraints offered by the location's task and the user's input can be used to determine the information to be presented to users and the modality or service channel through which it should be presented. Mobile devices may be equipped with a variety of powerful sensors, such as geo-positioning systems to identify location, biometrics to identify users, and tagging and tracking technologies to identify nearby objects, to name but a few.

Third, as mobile devices gain the ability to sense and interact with the objects around them, they become interfaces for these devices. The mobile devices serve as a remote control to other devices in the environment. The "remote control" mobile device interface may be structured primarily around the location and its task, rather than on specific devices in the location.

By integrating these three capabilities, a new environment of high fidelity enriched services may be provided to users of mobile devices any time, anywhere. The possibilities for enhancing the value of daily social and business interactions are endless. Likewise, the enhanced value provided by increased efficiencies, lower cost transactions and added value to the users in their transactions may be extracted by the suppliers of the services at the command of mobile device users.

As used herein, a location service provider is the provider of services at that location, such as a store, a bank, etc. The location service provider may have a computer server in communication with a network to send and receive data in cooperation with the mobile device. The server may be at the location or remotely located. A remote service provider is the provider of services from a location external to that location, and not considered to be associated with that location. For example, at the location of a bank, the services provided by the bank would not be remote even if the bank's servers were not at that location. A service not associated with the location service provider that provides interest rates comparisons or product comparisons through the network to the mobile device user through the service channels would be a remote service provider. A service channel, as used herein, is anything that delivers information, aid or assistance to the mobile device user and includes the personal mobile service channel associated with the mobile device or location service channels situated at the location, such as displays, kiosks, printers, speakers, electronic signs and staff members of the location service provider.

As noted above, a first alternative aspect of the invention is directed to delivering context-based services to a user of a mobile device through a plurality of service channels. According to this aspect, a method is provided that includes identifying the location of the user or establishing the user's task, presenting a task template to the user, identifying channels proximate to the user, and then modulating the services provided to the user according to the available channels. Preferably, the services may be shifted between the mobile device and a local service channel without any interruption in the stage of the service being provided, that is at the same point in the service transaction without having to restart the service transaction.

For example, one powerful real world application of the Mobile Valet occurs in the purchasing process—particularly at the point of purchase. Here is an example of how it would work. Shopping for an inkjet printer, as a user enters a store, the Mobile Valet immediately identifies where the user is and the task at hand—purchasing a printer. The task may have been determined based on the user's profile, which may include information from past use of the mobile device from which the user's interest in completing a certain task is determined from the context of the location. Alternatively, the task may be requested by the user from a general services template on the device that was appropriate to the location. The device directs the user to the printer section, where the user simply points the Mobile Valet toward an interesting model to collect a unique product identifier, such as from a bar code tag on a printer. This is then used to request online services such as independent product reviews, third-party financing options or video installation instructions.

Instead of reviewing the personalized information only through the "mobile service channel," i.e., tiny device screen, the user uses the Mobile Valet to redirect the information to a more suitable service channel or display, such as a nearby video kiosk. Used in this way, the Mobile Valet acts as a type of remote control, allowing the user to scroll through the various screens or fast forward to relevant sections of video. After a thorough product review, the user purchases the printer that suits her needs and continues on her way. In effect, they are likely to become "remote controls to the world."

Combining these capabilities creates a newly empowered mobile device—one capable of capitalizing on the both the vast resources available online and the technology infrastructure of a location, leveraging the best features of each. As the resources are vast, the mobile device may take advantage of using a dynamic discovery protocol for seeking out those services that are presently available for the services requested. The user profile of the mobile device user and the present context of the device may be used to seek out in real time those remote service providers who may provide the requested services when requested. The location service channels to present those services may also influence the selection of the service provider, as only the mobile device user may have a preference for only those providers with high fidelity content that can deliver the enriched services available through close-by location service channel.

As noted above, a second alternative aspect of the invention is directed to context-based user interface templates on the mobile device that provides a common array of services available to the user depending on the context, such as location, task or function that may be based-in-part on environmental cues. The context may also be determined by objects they are currently looking at, what they have recently looked at, alternatives available locally, etc.—that is, information about where the users are and what they're doing at that moment. In other words, the present invention also relates to mobile device interfaces that enable location-specific tasks.

According to this aspect, a method is provided for coordinating the enhanced delivery of services through a plurality of service channels that includes presenting to a user of a mobile device a plurality of context-based user interface templates, wherein each context-based user interface includes a selection of available services from a local service provider at the location of the device, the services being available at said location through the mobile device channel and one or more location service channels.

This method includes associating general service templates and/or general task templates with specific locations. The templates may even be specific to services associated with certain types of products, in the case of tasks for shopping. In particular, general mobile devices can be used in a situated context to provide access to the services and resources of a particular location, and, optionally, associated with certain types of products at that location. By dynamically interacting with the environment and the templates, the user and/or service provider can shift services between the mobile device and available local or location service channels. The local channels can be part of the technical infrastructure at the location (e.g., kiosks, monitors, speakers, etc.) and can also include the staff at the location.

Designing mobile applications to support such location-specific tasks requires an interface that reflects the natural structure of tasks typically performed in various locations. While location-specific tasks will have some functionality that does not generalize, there are, nevertheless, aspects of tasks that do apply across domains that can be used as a starting point to design and structure interfaces. This is much like the "file" and "edit" menus we find on most general computer software applications.

While the particular functions a user can invoke necessarily vary from application to application, there are certain general functions that make sense in virtually all applications. For example, in a PC computing context, such functions include many of the key features in the File and Edit menus, such as "new," "open," "close," "save," "print," "cut," "paste," "delete," etc. The analog of these "file" and "edit" menus for locations is a common, intuitive interface to task functions likely to be found across many locations. Common steps often include the need to find the place, park, register, say what we want, buy admission, contact the "host," find any people with whom we will be collaborating on the task at hand, check the readiness of the specific site where we will pursue our task, find that site, find and check the status of any tools we will need, identify who can help us, find a place to buy coffee, do work, and go to the bathroom while waiting for the task to begin, perform the task, cleanup, and get to the next task.

The mobile device is used in the roles described earlier—as a remote control to invoke many of these environmental functions and services, as a rich channel to the user for delivering information about these services, and as a set of context sensors capable of detecting task relevant information necessary to support these services. The device collaborates with the physical location by doing things as simple as providing a room name or phone number, to functioning as a remote control for a net appliance.

The following are examples of the common interface needs: A visitor attending a meeting at an office, and a customer visiting a store intending to select and purchase a camera. Briefly, in the meeting scenario, an out-of-town employee arrives in the office and deals with issues including registering, coordinating with colleagues, arranging and finding a temporary desk, dealing with meeting services requests, finding and using office equipment (e.g., projectors, VCRs, printers), and arranging transportation to leave. Briefly, the store scenario involves a customer interested in a digital camera arriving at the store, finding the appropriate part of the store, finding the right salesman, getting directions on how to try and use particular models on display, getting third party customer service advice on camera selections, being presented with alternative vendors, third party financing, and third party insurance options, determining compatibility with other equipment. While the two scenarios are clearly different, they share the need to find locations, use local equipment, invoke supporting services, find people, and get help with local resources.

In both of these scenarios, the mobile device preferably interacts with a local server at the location running a "task host" application that is aware of the task to be performed, the resources of the location, and the user. The offices and stores are equipped with active badge sensors and various tagging and locating devices to detect the presence of people in any office or conference room and monitor the whereabouts of people and objects throughout the workplace or store. The task host application exploits the information from these tools and, in part, may make use of earlier awareness systems built on this infrastructure, such as described by McCarthy & Meidel, *ActiveMap: A Visualization Tool for Location Awareness to Support Informal Interactions*, First International Symposium on Handheld and Ubiquitous Computing (HUC '99), Karlsruhe, Germany.

Alternatively, the task host application may be running on a remote server in communication with the mobile device, or the application may be running on the mobile device. Thus, the user interfaces may preferably be resident on the server and downloaded to the mobile device as needed, or be resident on the mobile device.

The interface for the mobile application is designed around the stages of generic location-based tasks. Within each stage, the core objects, locations, and people, we work with, and the actions we need to perform are identified and enabled. At each task stage, there is typically a focus object (e.g., the presentation we intend to give at a meeting or the person we are going to see/the camera under consideration), and a small number of supporting objects, (e.g., overhead projectors, printers, VCRs, executive assistants, AV specialist/other cameras under consideration, accessories, salesmen, customer service reps). These supporting objects play predictable supporting roles (i.e., they provide an alternative or an enabling service).

The actions a user wants to perform tend to be functions of the focus object and its type. Thus, a core set of actions is included as a function of the focus object type. For example, if the focus object is a person, a user will frequently want to contact them, invoke their role, send them something, pay them, or query them. If the focus object is a location the user will want to go there, see the current status and contents, reserve it, prepare it, release it. For physical objects, the user may want to buy, configure, send, examine, return, invoke, or release them. For a service or event, the user may want to register, reschedule, cancel, upgrade/downgrade, repeat, undo, start, stop, and continue.

More generally, the user may wish to access context sensitive help, the most recent task pursued by the user at this location (so that, for example, the user can request the same arrangements as last time), and any changes and exceptions to the routine since the user's last visit to this location. For example, is someone the user normally deals with no longer working here? Are there any new facilities or offerings? And what exceptions to the norm are in effect. Is the store or office closing early? Is someone absent? Is a certain dish not on the menu?

Preferably, due to limited bandwidth and display size, not all "menu options" are shown at once. The selection is made on the basis of the particular task stage and the services available to support a given focus object. Moreover, not all information is intended to be received by the user through the device. Instead, other service channels or displays available in the environment are used, but controlled through the mobile device. Once again, the intent is not for the mobile device to become the predominant tool to perform all functions everywhere but rather to use such devices, with the appropriate interfaces, to complement the facilities and services at a location and ease the way the user pursues tasks.

As noted above, a third alternative aspect of the invention is directed to enabling the cooperation between remote service providers and location service providers to provide through a plurality of service channels those services desirable to a user based on the services requested through the user's mobile device or based on the user's profile.

According to this aspect, a method is provided that includes identifying services requested by a mobile device user, determining the local service channels available to present said service, accessing the user's profile available to a remote service provider, and then based on the profile, determining additional services useful to the user, and sending a request to the local service provider to provide the additional services.

This method may enable the collaboration between remote service providers and the personnel at a location—both in terms of facilitating the delivery of a coherent service as well as the business models around it, such as remote service providers paying to use one of the channels. At an appropriate time during a user's interaction with the system, the staff personnel could be alerted to show the user information or instructions or accessories associated with the product or task at hand. Likewise, the remote service provider may alert the staff to a user's interest in a product, and suggest the staff person bring to the attention of the user a particular brand or product that would satisfy or compliment the user's present interest.

For example, a user may have a preferred vendor of content that maintains its own profile of the user. The remote service provider may prompt the location service provider to provide ancillary services to the user without the user having to make a specific request. The user may pre-select printers of interest with the remote service provider. Upon entering a store, the user's mobile device identifies the location, presents a general service template, and notifies the remote service provider of the user's location. In response, the remote service provider presents information of predetermined interest to the user and automatically prompts the store to provide a salesperson with information or products of interest to the user, such as a product demonstration.

In the collaboration between remote service providers and local service providers, the following scenario is also possible. A person arrives in the printer department of an electronic store. His mobile device senses his location and displays a small list of service categories appropriate for the printer department. The categories are not unlike the speed dial buttons on a telephone in a hotel, where each button is for a service most likely to be used in the hotel. In an electronic store, these services may include customer service, information, financing, warranties, and directions. The mobile device dynamically discovers the services available for each of these categories. Some will be services provided locally by the store, and others are from remote service providers with whom the customer may optionally have a pre-existing relationship.

In this scenario, the customer chooses a product comparison service and selects the printers to be compared using his mobile device. The mobile device is pointed at the printer and through an infrared port and keystrokes by the user, the identification of the printers are provided to the mobile device. The remote service provider presents a comparison of the printers on the display of the mobile device. While this comparison is about as much information as can fit on the display of the mobile device, it is not sufficient for the user. The user moves near a kiosk display in the store. With a push of a button on the mobile device, the product comparison service is redirected from the mobile device to the kiosk display, where the same service can be delivered in far greater fidelity and detail.

The user continues using his mobile device as an input device to provide input to the remote service provider. The user may use the mobile device to select additional services. The user may point the mobile device to printers for which he wants more information or to add to the product comparison. These services are delivered to the kiosk display. After honing in on a printer of greatest interest to the user, the remote service provider sends a signal to the local service provider, noting that the user is interested in purchasing that particular printer and would require ancillary service. The local service provider transmits instructions to another mobile device carried by a staff member of the local service provider. The staff member reads the instructions, selects the correct ink cartridges and cables needed for the printer and delivers them to the user. The staff member may access pieces of information from the user's profile with the local service provider that may include things such as past purchases of the user and credit card information of the user. The staff member confirms the user's interest in the printer and the accessories and then inputs information into the second mobile device to automatically complete the transaction and debit the user's credit card. Also, the local service provider automatically sends instructions for a printer to be delivered to the merchandise pick-up desk.

Another example that builds upon the last, illustrates the versatility of the Mobile Valet. While in the store shopping for the printer, the mobile device may alert the user to an upcoming tennis game stored in the user's calendar application, the alert coming according to a reminder set by the user. Depending on the user's preferences stored in the user's profile, a user interface may appear with specific features for a task of making a reservation of a tennis court on-line. The user may approach a location service channel, and for a fee, take precedence over another user to make the service channel available for making the tennis reservation.

Another example taking advantage of some of the features of the invention as noted above includes the use of the mobile device by a maintenance technician while repairing on a piece of equipment on a factory floor. The mobile device may provide access to the remote server of the manufacturer of the equipment and provide relevant services and information to the technician. Likewise, the mobile device may sense RF tags on the equipment that identify the equipments configuration, or the mobile device may scan bar codes on the equipment that identify the equipment configuration. That information is transmitted to a server that determines the technician's context and location, and by accessing information in the technician's user profile, the mobile device displays a user interface appropriate for the likely tasks the technician is involved in based on his technical specialty and the equipment details. Further interaction with the user interface may connect the technician with a different remote service provider. The technician may be able to request services from one of several specialty service providers, and using available service channels in the vicinity of the equipment, have access to "face-to-face" consultations with experts of his choice, or the lowest price expert available.

As noted above, a fourth alternative aspect of the invention is directed to managing the flow of information from a plurality of remote service providers to a plurality of location service channels by aggregating the service channels for bulk transactions with the remote service providers. According to this aspect, a method is provided for identifying a number of locations and one or more location service channels at each location capable of providing services to mobile device users, aggregating a plurality of the location service channels, making available at least one of the aggregated location service channels to a remote service provider; and presenting services from the remote service provider to the at least one location service channel. Preferably, the method includes registering the location service channels and accessing a preference profile for the use of the service channels established by the location service provider of the channels.

In another embodiment of this aspect of the invention involving the aggregation of location service channels, a communication network is provided that includes a mobile user node in communication with said network and capable of sending requests for services on said network, a plurality of location server channel nodes in communication with the network, the channel nodes capable of displaying services requested by the mobile user node, an aggregator server node in communication with the network, the aggregator server node managing the availability of the location server nodes to display service requested by the mobile user nodes. Preferably, the network includes a location server node coupled with the location service channel nodes and establishing preference rules for the availability of the location service channel nodes. Preferably, the network further comprises remote service providers in communication with the aggregator node for delivering service to service channel nodes under the control of the aggregator server node.

In the context of enhancing the value to remote service providers, another aspect of the invention includes the aggregation of location service channels for bulk availability to remote service providers. Advertising customized to the particular interest of a user at a location may be on the one hand delivered to that specific user, while on the other hand being taken under the control of a channel aggregator for bulk resale to advertisers.

Likewise, an aggregator may have a separate server and manage the flow of information from a variety of alternative remote service providers to requests for generic services requested by a mobile device user. One of the advantages of using an aggregator in this environment is to reduce the cost of transactions between remote service providers and local service providers over access to the location service channels. A remote service provider may negotiate with a single aggregator for access to numerous service channels at numerous location service providers. An aggregator can then negotiate with individual location service providers for access to its service channel on behalf of a number of remote service providers, or with service brokers acting as agents for the remote service providers.

Under this scenario, when a request for remote services is sent by a mobile device user at a specific location, the request is sent to an aggregator's server. The aggregator matches up the request for services with an appropriate remote service provider based on a number of factors such as the mobile device user's profile, the types of location based service channels that are available at the time and at that location, the remote service provider's preferences for types of users it wants access to, the types of service channels it wants access to and how much the remote service providers are willing to pay for that access. On the other hand, it may be the mobile device users who are paying for access to the information or services of the remote service providers. In this case, the aggregator can match up the remote service provider who is willing to provide services requested for the amount the mobile device user is willing to pay. Also, the location service provider may require a portion of those access fees for maintaining and supporting the technology infrastructure for the location service channels. This aggregator is well positioned to coordinate the requests and delivery of services between all of the actors in this system.

As noted above, a fifth alternative aspect of the invention is directed to tracking the services provided to a mobile device user at a first location and compensating the first location service provider for providing those services if the user later completes a transaction at a second location when the transaction was connected with the services provided at the first location.

According to this aspect, a method is provided that tracking requests for services from mobile device users at a location, tracking services provided at said location by said location service provider to said user, tracking transactions later made by said mobile user at said location and at other locations; and when said transactions are associated with at least one of said services requested and services provided, compensating the location service provider.

Local service providers may see enhanced value from a system in which they are compensated for providing services that later influence users transactions, and thereby be encouraged to provide the infrastructure of the location service channels. The system can track the objects viewed by a mobile device user and to the extent that mobile device user obtains significant information from one local service provider yet winds up buying that same product from a different local service provider, the system can transfer a commission to the first local service provider based on tracking of the participation of the first service provider in the developing interest and ultimate sale of the product to the mobile device user. The commission can be based on things such as physical page views on the task template associated with the product that was purchased, or may be based on the identification of the product through the mobile device's sensors.

With the value added to users' transactions, there may naturally be competition among remote service providers for access to the users through the multiple local channels. Also, the local service providers may also derive value by managing the use of the service channels at its location, which are a limited resource. For example, the local service providers may be able to decide which customers have access to the service channels and for how long. Loyal, long-term high-volume customers may be allowed greater access to the location service channels. Armed with the demographic customer base, the local service providers can decide which remote service providers have access to the local service channels and for how long. For example, preferred vendors or remote service providers with strategic alliances may have preferential access to presenting content or services through the location service channels. The local service providers may decide what information is displayed there, on what basis the service delivery has commenced and terminated. With the efficiencies achieved by this enhanced and enriched customized information or service delivery to the mobile device users, the local service providers can tailor the optimization of the use of these systems to enhance its value and ultimately the revenue stream seen by the local service providers.

The presently preferred embodiments will now be described more fully hereinafter with reference to the accompanying drawings, in which the presently preferred embodiments are shown. This invention may be embodied in many different forms and should not be construed as limited to the embodiments set forth herein; rather, these embodiments are provided so that this disclosure is thorough and complete, and illustrates the invention to those skilled in the art. Like numbers refer to like elements throughout.

As will be appreciated by one of ordinary skill in the art, the present invention includes several aspects that may be embodied as a method, data processing systems, computer programs, or physical products. Accordingly, the present invention may take the form of an entirely hardware embodiment, an entirely software embodiment or an embodiment combining software and hardware aspects. Furthermore, the aspects of the present invention may take the form of a computer program product on a computer-readable storage medium 30 having computer-readable program code means embodied in the storage medium 30. Storage medium 30 includes any suitable storage medium that may be utilized including memory such as read-only memory (ROM), random-access memory (RAM), dynamic random-access memory (DRAM), SDRAM, and EEPROM; magnetic media such as hard disk drives, and floppy disk drives; optical media such as CD-ROM, CD-R, CD-RW, DVD-ROM, DVD-RAM, and DVD-RW; magneto-optical media; and any other type of media which may be used to store digital information, such as a computer program.

As noted above, a sixth alternative aspect of the invention is directed to a mobile device having wireless connectivity, remote sensors, location pinpointing system, and computer-executable instructions for requesting services through a plurality of service channels. In one embodiment, the mobile device includes a service channel, sensors and a computer-readable medium for storing computer executable instructions thereon, wherein the instructions provide for the method of identifying one or more location service channels associated with the location through which services can be provided to the user; the sensors provide for remote identification of physical objects proximate to the mobile device; and the mobile device service channel includes a user interface for permitting the user to select a physical object detected by the sensors, to select tasks that may be accomplished at the location by utilizing one or more of the location service channels and the mobile device service channel, or to coordinate the delivery of services through one or more of the location service channels and the mobile device service channel.

FIG. 1 illustrates a data processing system on which a mobile valet device 20 may be utilized, according to one preferred embodiment. The present invention is not limited to any particular hardware or technology described herein, or that can be configured to be a wireless mobile device of the type known today, such as PDA's, cellular phones, text pagers, etc. The following description of a Mobile Valet device is illustrative of some of the optional functionality that may be desirable for use in accordance with the various embodiments and aspects of the present invention.

As seen in FIG. 1, Mobile Valet device 20 includes a processor 24, a storage medium 30, a user input device 34, an output device 46, a locating device 64, and a communications device 74. Processor 24 is any programmable electronic device known to those skilled in the art that can store, retrieve, and process data, such as a standard CMOS computer processor. Preferably, processor 24 includes an operating system 26 resident in processor 24. Operating system 26 may be resident in processor 24 or in storage medium 30. Processor 24 is communicatively connected with storage medium 30 and can send and receive signals to and from storage medium 30. Processor 24 is also communicatively connected with output device 46 and user input device 34, wherein processor 24 sends signals to output device 46 and processor 24 receives signals from user input device 34.

Figure 7:
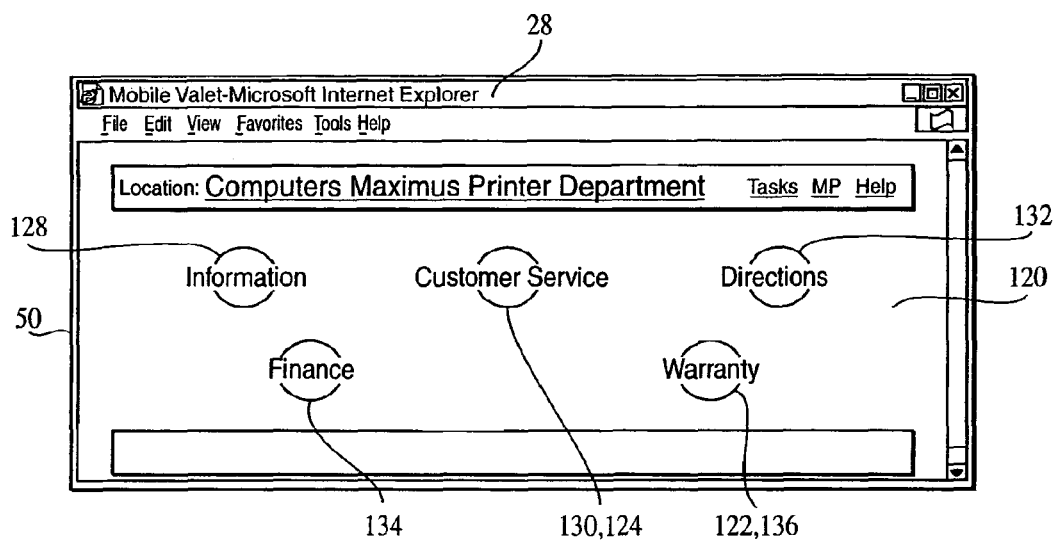

Storage medium 30 stores a mobile valet application 28 that promotes the delivery of location-based services to a user within a given geographical location 22. The geographical location 22 includes any location or a portion of any location which encompasses both the user and the mobile valet device 20, and can include locations such as a store, a warehouse, a building complex, an office complex, a bank, a stadium, a golf course, a train station, a bus station, an airport, a beach, a park, a city, a state, or any other geographical location in which a user may wish to travel to. The mobile valet application 28 generates a location-based menu 120 based on the geographical location of a user, as illustrated in FIG. 7. Preferably, mobile valet application 28 resides on storage medium 30, as described above. Mobile valet application 28 may be running on operating system 26. Mobile valet application 28 is communicatively connected with locating device 64 and communications device 74 and can send and receive signals to and from locating device 64 and communications device 74, as illustrated in FIG. 1.

Figure 2:
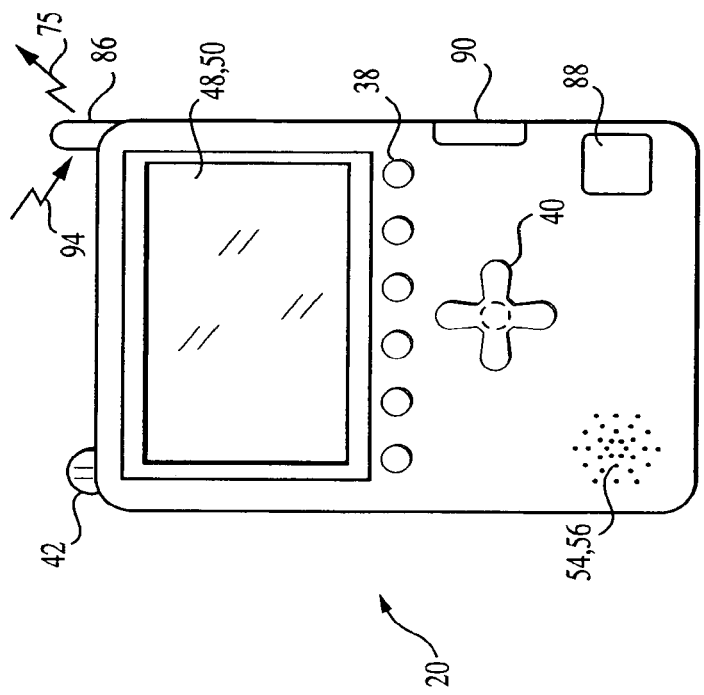
FIG. 2 is an illustration of a mobile valet device having a display screen, according to one preferred embodiment.
Figure 3:
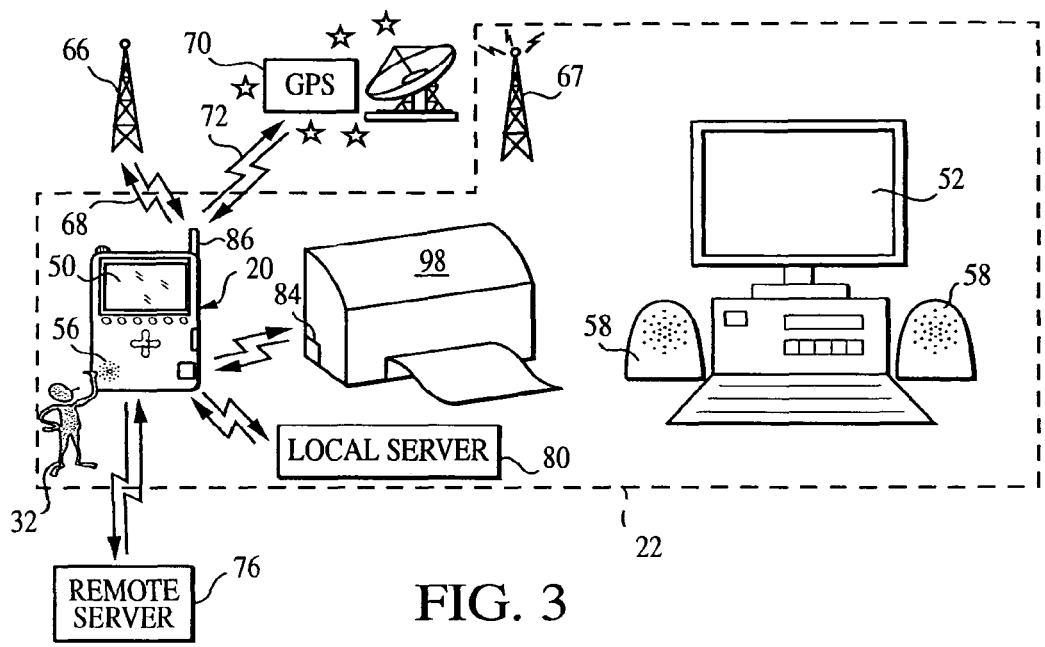
FIG. 3 is a block diagram of a system utilizing the present invention in a given geographical location, according to one preferred embodiment.

Processor 24 communicates and conveys information to the user on output device 46. The contents of output device 46 may be controlled or altered by mobile valet application 28 or operating system 26 either individually or in combination. Output device 46 may be any device that can communicate and convey information to a user known by those skilled in the art, such as a video display screen 48, a speaker 54, and a printer 60. Display screen 48 can include a local display screen 50 and a remote display screen 52, as illustrated in FIGS. 2-3. As used herein, local display screen 50 is a display screen that is mobile and therefore is carried with the user, while a remote display screen 52 is stationary and is not taken carried with the user.

Figure 11:
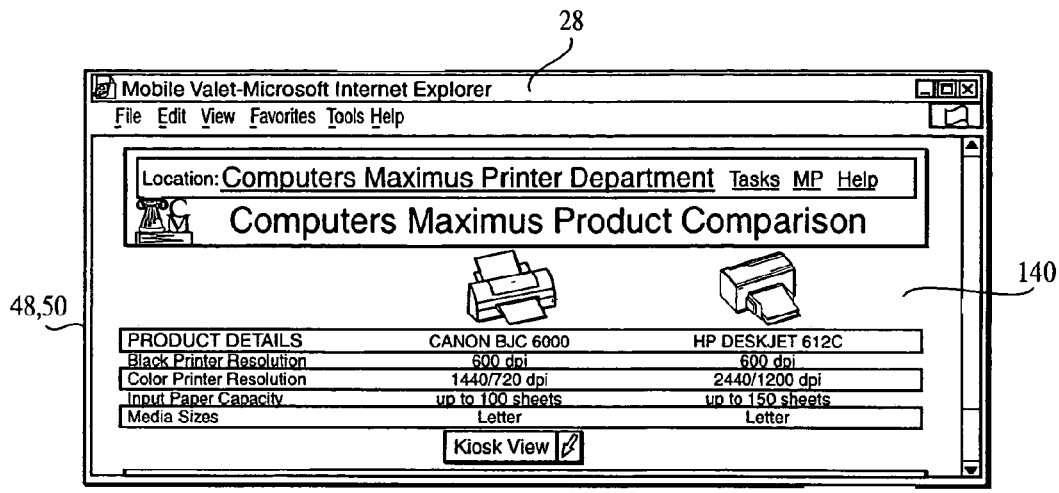
Figure 12:
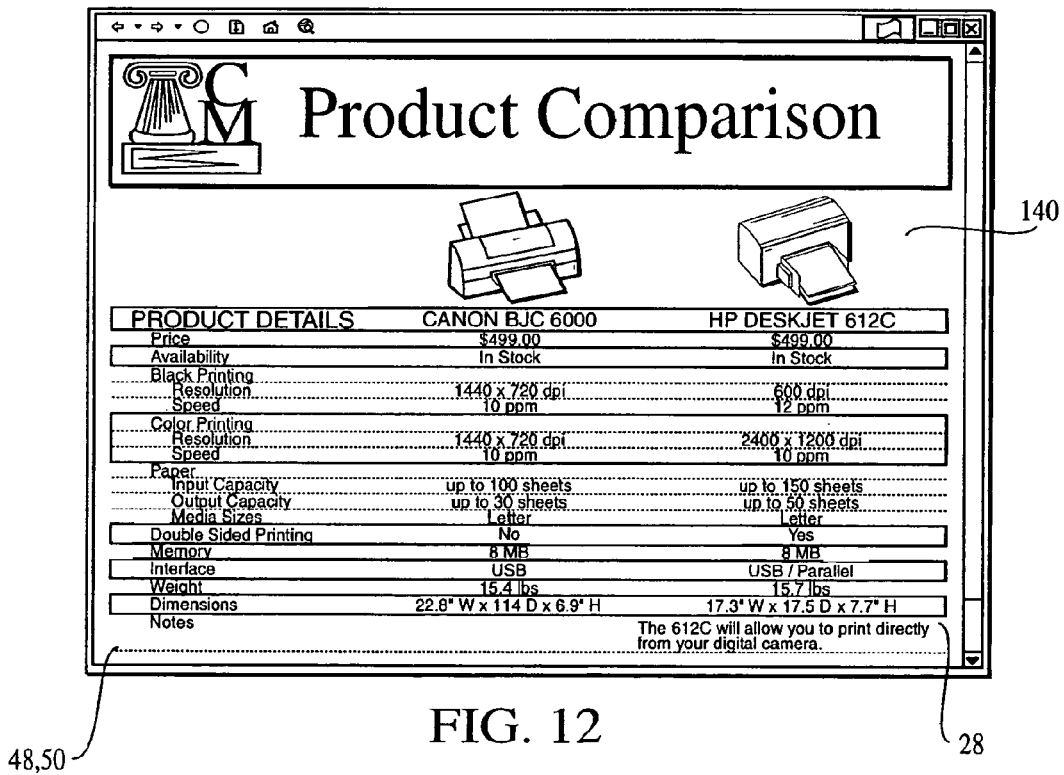
FIG. 12 is an illustration of a remote display screen, according to one preferred embodiment.

Display screen 48 has a plurality of picture elements (collectively referred to as a screen) that may define the appearance of mobile valet application 28, location-based menu 120, location based-service 122, general service menu 146, and any other object or text displayed on display screen 48, as illustrated in FIGS. 5-8. Display screen 48 may be a cathode ray tube, a LCD screen, or any other means for allowing a user to see mobile valet application 28. Preferably, display screen 48 comprises an LCD screen, since an LCD screen is lightweight, thin and typically compact enough that a user can easily carry mobile valet device 20. Display screen 48 displays mobile valet application 28, as illustrated in FIGS. 11 and 12.

Figure 8:
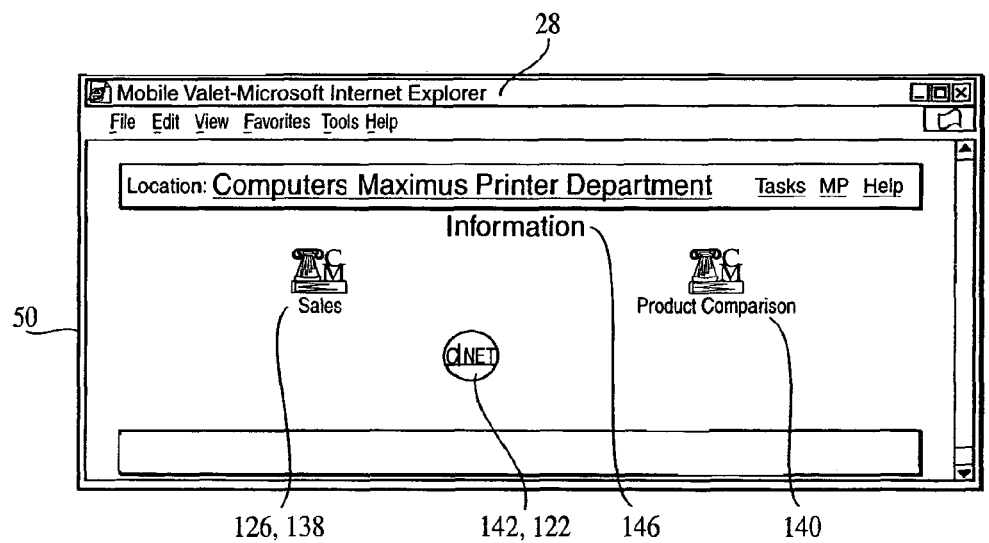
Figure 9:
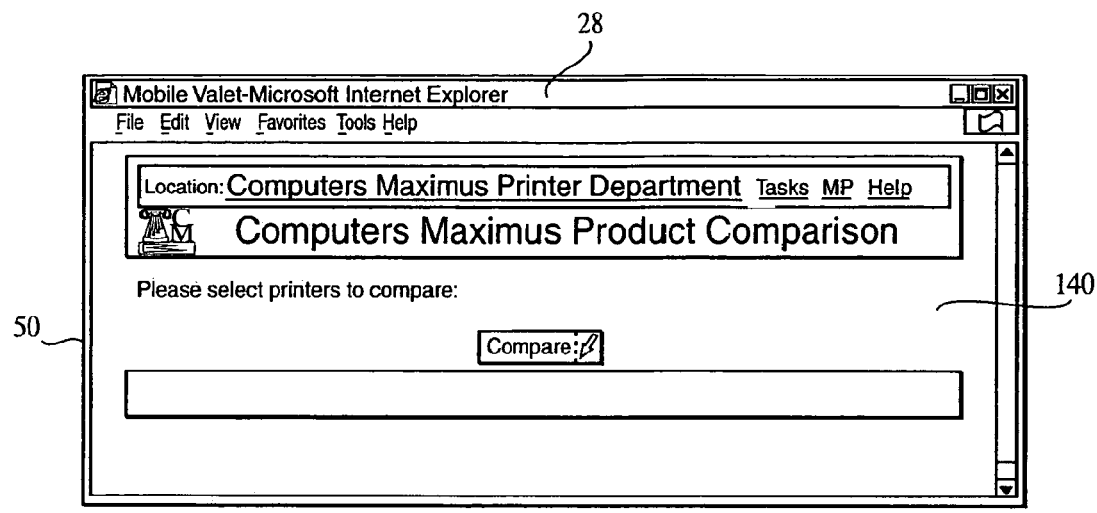
Figure 10:
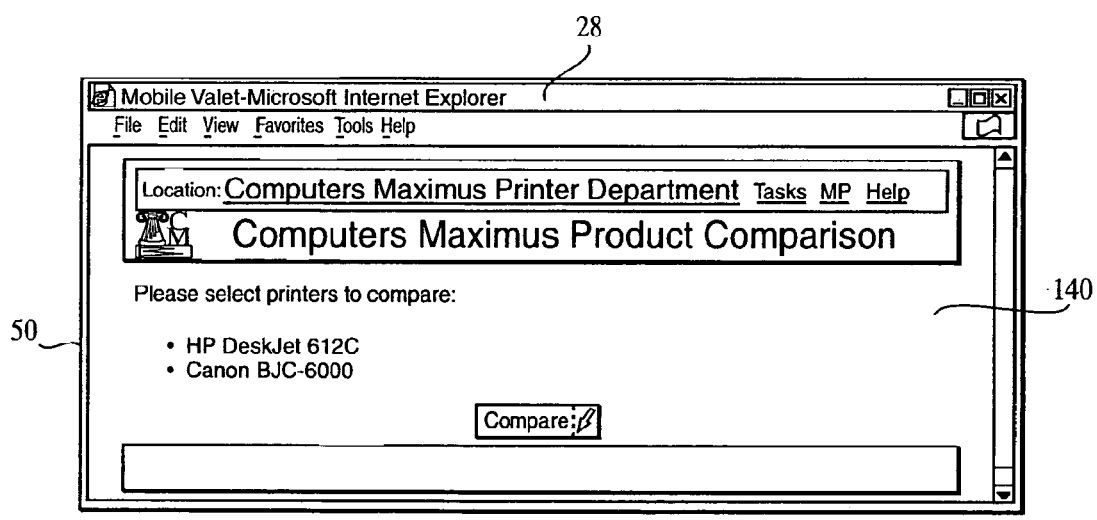

Referring again to FIG. 1, for obtaining input from a user, processor 24, operating system 26, mobile valet application 28, communications device 74, and locating device 64 utilize at least one user input device 34. User input device 34 may be used to designate areas of the display screen 48 by performing a pointing or selection operation on those areas. User input devices 34 may also be used to input characters which may in turn instruct at least one of processor 24, operating system 26, mobile valet application 28, communications device 74, and locating device 64 to perform a task. User input device 34 includes any device which can be used by a user to instruct at least one of processor 24, operating system 26, mobile valet application 28, communications device 74, and locating device 64 to perform a task known by those skilled in the art. User input device 34 includes such devices as a keyboard 36, a button 38, a pointing device 40, a microphone 42, and a stylus 44. Pointing device 40 may include a mouse, a trackball, a touch pad, a graphics tablet, or other pointing devices known to those skilled in the art. Pointing device 40 allows a user to move a mouse pointer located in display screen 48 over an object located in display screen 40, to select that object. Stylus 44 can be used to input text and other information and select objects on display screen 40. User input devices 34 may be used to input information, such as the name of an item or service that needs to be selected, into mobile valet application 28. In one embodiment, user input devices 34 are used to select item a location-based service 122, such as a general service 124 or a specific service 126, as illustrated in FIGS. 7 and 8.

As depicted in FIG. 1, communications device 74 is communicatively connected with a server 80 and the mobile valet application 28. Communications device 74 is any mobile device capable of sending and receiving digital or analog message known by those skilled in the art, such as a mobile telephone, a radio wave transmitter and receiver, a cellular transmitter and receiver, a BLUETOOTH™ equipped device, an infrared transmitter and receiver, and a laser beam transmitter and receiver. Server 80 is a computer that is designed to store information and distribute information to a user upon receiving a request for information. Server 80 may be a remote server 76 or a local server 80, as shown. As used herein, a remote server 76 is a server that is outside a given geographical location 22, while a local server is a server that is within a certain geographical location 22, as illustrated in FIG. 3. Communications device 74 transmits a request signal 75 for information by either a user or by the mobile valet application 28 to a server, such as a remote server 76 or a local server 80, whereupon the server sends back an information signal 94, which is then received by the communications device 74 and forwarded to the mobile valet application 28. Preferably, communications device 74 uses an antenna 86 to transmit the request signal 75 and receive the information signal 94, as illustrated in FIG. 2. Preferably, communications device 74 is portable and small enough such that the mobile valet device 20 can be held by a user 32. In one preferred embodiment, communications device 74 is physically connected with a display screen 48 and a processor 24, in order to make mobile valet device 20 portable. Signals sent and received by the devices described herein, such as transmitter signal 68, GPS signal 72, request signal 75, information signal 94, sensing signal 95, and location signal 96, may include analog or digital signals.

Remote server 76 or local server 80 processes the information encoded within request signal 75 and generates information signal 94. Information signal 94 comprises information that can be used to generate location-based menu 120, general service menu, and location based-services 122. Server 80 transmits information signal 94 and communications device 74 receives information signal 94. Information signal 94 is then transmitted to mobile valet application 28, wherein mobile valet application 28 uses information signal 94 to generate location-based menu 120, general service menu, and location based-services 122.

In one preferred embodiment, mobile valet device 20 uses a web browser to access information stored within server 76. The web browser is located within storage medium 30. A web browser is any application or program that can access information stored on the Internet, including the World Wide Web, the Usenet, Telnet, FTP sites, and other locations on the Internet. In one preferred embodiment, communications device 74 communicates with remote server 76 through a web browser, and accesses the information stored within server 76 using the web browser. In one preferred embodiment, communications device 74 sends a request signal 75 to server 76 using a web browser, and server 76 generates information signal 94 as a result.

A web-services architecture product such as eSpeak from Hewlett-Packard Corp., was used as the support platform for the Mobile Valet prototype. Alternatively, .NET, the Microsoft XML Web services platform, may be used, as well as other web services platforms. XML Web services allow applications to communicate and share data over the Internet, regardless of operating system, device, or programming language. The benefit of such platforms are seamless, compelling experiences while using the Mobile Valet.

While the above embodiments use communications device 74 and server 76 and/or server 80 to retrieve information within an information signal 94 that can be used to generate location-based menu 120, general service menu, and location based-services 122, in one preferred embodiment this information is stored locally within mobile valet device 20 on storage medium 30. The information can then be retrieved directly by mobile valet application 28 and be used to generate location-based menu 120, general service menu, and location based-services 122.

As illustrated in FIGS. 1 and 3, locating device 64 is communicatively connected with the mobile valet application 28. Locating device 64 is any device that can be used to determine the location of a user known by those skilled in the art, such as but not limited to automatic location identifying devices (ALI's), GPS receivers, radio wave receivers, cellular receivers, laser beam receivers, and compasses. Upon determining the location a user, transmitter generates a location signal 96 and transmits the location signal 96 to the mobile valet application 28. In one embodiment, locating device 64 determines the location of the user by receiving transmitter signals 68 from a transmitter 66 and uses the transmitter signals 68 received from the transmitter 66 to generate a location signal 96. Preferably, locating device 64 uses transmitter signals 68 to resolve the location of a user. In one embodiment, locating device 64 receives a global positioning satellite (GPS) signal 72 from a global positioning satellite 70 and uses the GPS signal 72 to resolve a user's location and generate a location signal 96.

In one preferred embodiment, transmitter signals 68 are directionally phase encoded enabling locating device 64 to resolve the relative location of a user using triangulation techniques. In one preferred embodiment, transmitter 66 is a local transmitter 67 located within geographical location 22, as illustrated in FIG. 3. In one preferred embodiment, locating device 68 comprises a radio receiver that resolves the specific location of a user with respect to a set of local transmitters 67. In yet another preferred embodiment, locating device 68 comprises both a GPS receiver and a radio receiver that receive transmitter signals 98 and GPS signals 72 to resolve the specific location and the general location of a user.

As used herein, the specific location of user 32 is the location of user 32 accurate to within less than ten meters, and the general location of a user is the location of a user accurate to within at least about ten to 500 meters. Once locating device 64 resolves at least one of the general location and the specific location of a user, locating device 64 generates a location signal 96 and transmits the location signal 96 detailing at least one of the general location and the specific location to the mobile valet application 28, wherein the mobile valet application 28 uses the information within the location signal 96 to generate a location based-menu 120 with at least one location-based services 122. In one preferred embodiment, the location based-menu and the location-based services are continuously updated to correspond with the current location of the user, as the user moves from one geographical location 22 to another geographical location 22. Internet based geographic location referencing systems are known in the art, such as described in U.S. Pat. No. 6,202,023 B1, issued to Hancock et al. on Mar. 13, 2001.

In one embodiment, as shown in FIG. 1, mobile valet device 20 includes a sensing device 82 that is communicatively connected with mobile valet application 28. Sensing device 82 is any device capable of sensing a signal or element in the surroundings, such as a bar code, a radio transmission, an infrared transmission, a BLUETOOTH™ signal, a laser beam, or even an image, and generate a sensing signal 95 in response. Sensing device 82 is any device known by those skilled in the art that is capable of sensing a signal or element, such as a bar code scanner 90, a microphone 42, an infrared (IR) receiver 88, a video camera, and a radio frequency receiver. In one preferred embodiment, sensing device 82 is a bar code scanner that senses and scans in a bar code 84 and generates a sensing signal 95 as a result.

FIGS. 2 and 3 illustrate a mobile valet device 20 for delivering location-based services to a user 32 within a specific geographical location 22, according to one preferred embodiment. Preferably, mobile valet device 20 is a hand-held device that can be carried around by a user 32. However, mobile valet device 20 can be connected with a larger piece of equipment or vehicle that can move around a geographical location with a user, such as a personal printer, a spectacle heads-up display, a shopping cart, an automobile, a bicycle, a caddy, or any other movable vehicle or device known to one of ordinary skill in the art.

Figure 4:
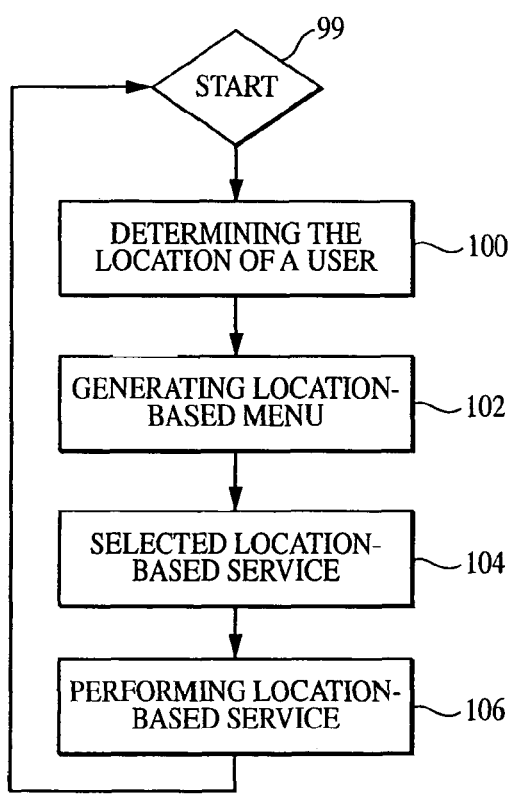
FIG. 4 is a flow chart of a mobile valet operation of the present invention.
Figure 5:
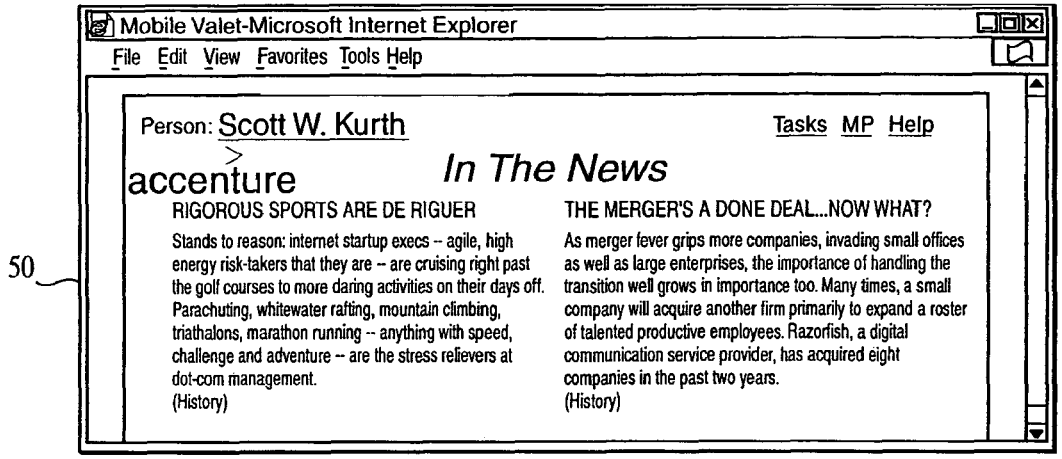
FIGS. 5-11 is an illustration of user interfaces on a local display screen and the various content displayed within the local display screen, according to one preferred embodiment.
Figure 6:
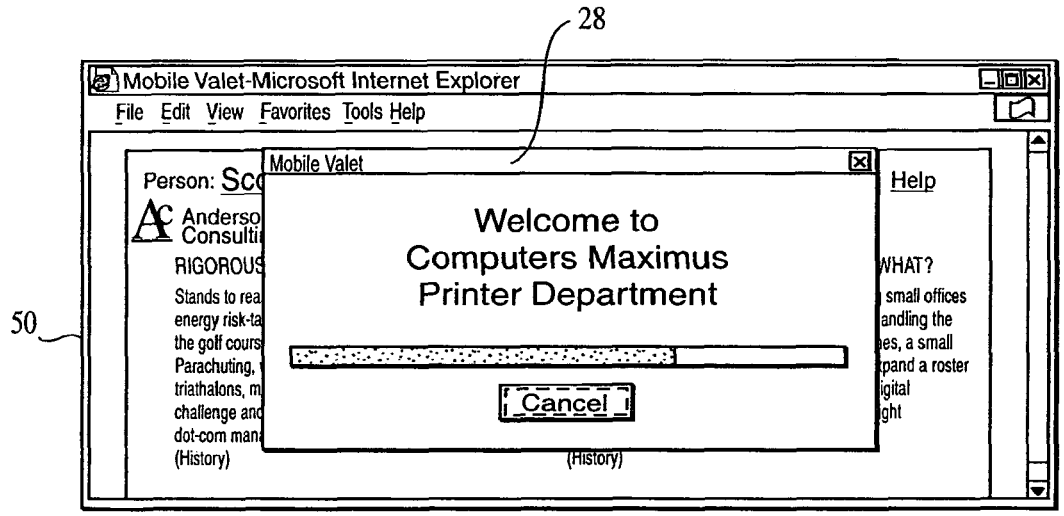

FIG. 4 is a flowchart illustration of methods, apparatus (systems) and computer program products according to the invention. It will be understood that each block of the flowchart illustration, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable storage medium 30 that can direct a computer or other programmable data processing apparatus to function in a particular manner, such that the instructions stored in the computer-readable storage medium 30 produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 4, a mobile valet application 28 is initiated in block 99. The mobile valet application 28 generates a location-based menu 120 or initiates a location-based service 122 based upon the location of a user. The mobile valet operation first determines the location of a user, as illustrated in block 100. The location of the user is determined by either using the location information within the location signal 96 generated by the locating device 64 or by using location information that is located on a server 80. If the mobile valet device 20 does not have a locating device 64 or if the locating device 64 is unable to generate a location signal 96, then the mobile valet application 28 will request location information from the server 80. Upon receiving the request for location information from the mobile valet device 20, the server 80 will then retrieve the location information from a database, or a look-up table, and transmit the location information to the communications device 74, whereupon the communications device 74 transmits the location information through an information signal 94 to the mobile valet application 28.

Upon receipt of the location information, the mobile valet application 28 then generates a location-based menu 120 based on the location of the user, as illustrated in block 102. In one embodiment, the mobile valet application 28 generates a request signal 75 for information and retrieves the information from within storage medium 30 to generate location-based menu 120. Request signal 75 includes location information. In another embodiment, the mobile valet application 28 generates a request signal 75 for information to the communications device 74, which in turn transmits the request signal 75 to the server 80. Upon receipt of the request signal, the server 80 then generates an information signal 94 that is then received by communications device 74 and transmitted to mobile valet application 28. Upon receipt of the information signal 94, the mobile valet application 28 generates a location-based menu 120. In one preferred embodiment, the mobile valet application 28 generates a request signal 75 without receiving the location information from either the locating device 64 or the server 80.

Location-based menu 120 is a menu of services based upon the location of the user. The location-based menu 120 provides at least one location-based service 122, depending on the location of the user, that can aid the user while in a particular geographical location 22. For example, if the user is in a retail outlet, such as a computer store, the mobile valet application 28 will generate a location-based menu 120 with at least one location-based service 122, such as an information service 128 that is designed to aid the user while in the retail store. If the user is in a bank, the location-based menu 120 can generate a location-based service 122, such as a withdrawal service (not shown) that may help the user withdraw funds from the bank. Location-based services 122 are designed to aid a user while in a certain location.

Location-based services 122 can include such services as an information service 128 for providing information such as information about a certain item with a store, the name of the store, or directions to a department within the store; a customer service 130 for providing assistance to the user for purchasing, returning or exchanging an item, for conducting a transaction, or for general customer service; a directions service 132 for providing directions to a place, to an item within a store, to a store, for how to purchase an item, or how to conduct a transaction; a finance service 134 for providing financial assistance to a user who whishes to purchase an item; a warranty service 136 for a user who wishes to obtain a warranty for an item within a store; a sales service 138 for a user who wishes to receives sales assistance for purchasing an item; a product comparison service 140 for comparing a series of items or products within a store; a web-based information service 142 for retrieving web based information for an item within a store; and a help service 144 for helping a user conduct a transaction or purchase an item, as illustrated in FIGS. 7 and 8.

Upon generating the location-based menu 120, a user then selects a location-based service 122, as illustrated in block 104. Location-based services 122 include general services 124 and specific services 126. The selection of a general service 124 generates a general service menu 146, while the selection of a specific service 126 begins that service. For example, the selection of general service 124 such as an information service 128, generates a general service menu 146 that includes specific services such as a sales service 138, a product comparison service 140, and a web-based information service 142, as illustrated in FIG. 8. Selection of the specific service 126, such as product comparison service 140, begins the product comparison service 140, as illustrated in FIGS. 9-12.

Upon generating a location-based menu 120, having location-based services 122, the user selects a location-based service 122 using user input device 34 and the mobile valet device performs the location-based service 122 that was selected, as illustrated in block 106. If the user selects a general service 124, then the mobile valet application 28 will generate a request signal 75 requesting additional information from either the server 80 or the storage medium 30, whereupon the server 80 or the storage medium 30 generates an information signal 94 which contains general service information in response. Upon receiving the information signal 94 that contains general service information, the mobile valet application 28 then generates a general service menu 146 that contains location-based services 122, as illustrated in FIG. 8. If the user selects a specific service 126, then the then the mobile valet application 28 will generate a request signal 75 requesting additional information from either the server 80 or the storage medium 30, whereupon the server 80 or the storage medium 30 generates an information signal 94 which contains specific service information in response. Upon receiving the information signal 94 that contains specific service information, the mobile valet application 28 then begins executing the specific service 126 that was selected, as illustrated in FIGS. 9-12. Upon performing the location-based service 106, the mobile valet application 28 moves back to block 99, as illustrated in FIG. 4.

Mobile valet application 28 communicates information to the user through an output device 46, such as a display screen 48, a speaker 54, or a printer 60, as illustrated in FIGS. 1-3. Information can be any information received from the server 80 or the storage medium 30. Information can be communicated to the user not only on output devices 46 that are localized devices, such as local display screen 50 and local speaker 56, but also on output device 46 that are remote devices, such as remote display screen 52 and remote speaker 58. As used herein, localized devices, i.e., personal service channels, are devices that are on the user or travel with the user, and that do not require the use of a communications device 74 in order to communicate information with. Such personal service channels are preferably packaged with the Mobile Valet device. As used herein, remote devices, i.e., location service channels or location channels, include devices that are located within geographical location 22, but that do not move with the user, such as a kiosk, or a localized display that is tied into the locations technology infrastructure. The location service channels may also include staff personnel at the location. Remote devices may require the use of a communications device 74 in order to communicate with.

If certain information cannot properly or adequately be displayed or communicated to a user on a localized device, such as a local display screen 50 or a local speaker 56, mobile valet device 20 may transmit a request through communications device 74 to display the information on a location service channel, such as a remote display screen 52, as illustrated in FIG. 3, and in FIG. 12. Since the remote display screen 52 may be larger than the local display screen 50, because the user does not have to move around with the remote display screen 52, the remote display screen 52 may display more information than the local display screen 50, as illustrated in FIGS. 11 and 12. Alternatively, mobile valet device 20 can transmit the information through communications device 74 to a remote device, such as a remote speaker, which can be much larger than a local speaker, and therefore which can communicate a louder sound to the user. Likewise, the mobile valet device may transmit the information directly to a remote printer 98 to print out information obtained from a server. By utilizing remote devices, mobile valet device 20 can communicate information more efficiently, more effectively and more richly to the user.

Upon selecting a specific service 126, mobile valet device 120 can present the user the option to scan in a location item 98 located in a geographical location 22, as illustrated in FIG. 3. Location item 98 can be any item with a geographical location 22, such as a product, or a display, a piece of furniture, and a work of art. Mobile valet device 120 uses a sensing device 82 to sense a signal or scan an element. For example, a radio transmitter may be embedded in location item 98 that transmits a signal received by sensing device 82, or a bar code 84 may be placed on location item 98, whereupon sensing device 82 scans the bar code 84.

Upon scanning in a location item 98, sensing device then generates a sensing signal 95 and transmits the sensing signal 95 to the mobile valet application 28. Mobile valet application 28 may request sensing device 82 to generate a sensing signal 95 or sensing device 82 may generate a sensing signal 95 without receiving a request from mobile valet application 28. Sensing signal 95 send information to mobile valet application 28 such as the name of a product, the price of a product, and the location of a product.

Upon receiving sensing signal 95, mobile valet application 28 may generate a location-based menu 120, or a location-based service 122, based upon the information in the sensing signal 95. In one embodiment, mobile valet application 28 generates a request signal 75 in response to the sensing signal 95, and transmits the request signal 75 to the server 80 through the communications device 74.

In one preferred embodiment, mobile valet application 28 generates a page view signal that is transmitted to the server 80 through the communications device 74. A page view signal can be generated in response to a number of actions. For example, a page view signal can be generated by the mobile valet application 28 in response to receiving the location signal 96 when a user enters a given geographical location. A page view signal can be generated in response to the receipt of a sensing signal from the sensing device 82 by the mobile valet application 28. A page view signal can also be generated in response to the generation of the request signal 75 by the mobile valet application 28, wherein the request signal 75 request certain information from the remote server 76. In one embodiment, the page view signal is generated by the server 76 in response to any signal received from the mobile valet applications, such as the request signal 75.

The page view signal may be useful for tracking services requested by or services received by the user. This information may be useful for updating the user's profile, or the local service provider's demographic database, or for compensating the local service provider. For example, the local service provider's support for assisting the user in deciding upon and completing a transaction, say for a purchase of a printer, may be documented with this feature. Thus, even if the user completes the transaction elsewhere, the local service provider is compensated for its contribution to the decision-making process to led to a completed transaction. In one embodiment, this information may be used by printer manufacturers to provide incentive to local service providers to provide enhanced service even though they do not complete the transaction with the user.

In another example for making use of multiple location service channels, server 80 identifies a an available location service channel for a mobile valet device 20 based upon the request signal 75 received by the server 80 from the mobile valet device 20. Upon identifying a channel, the server then transmits information related to that channel to the mobile valet device 20. For example, if the mobile valet device sends a request signal 75 with information that indicates the mobile valet device 20 is in a grocery store, the server 80 may locate a display in the produce department close to that particular mobile valet device 20, and transmit information of interest to the user, either identified by the user or based on the user's profile, to that display.

Figure 13:
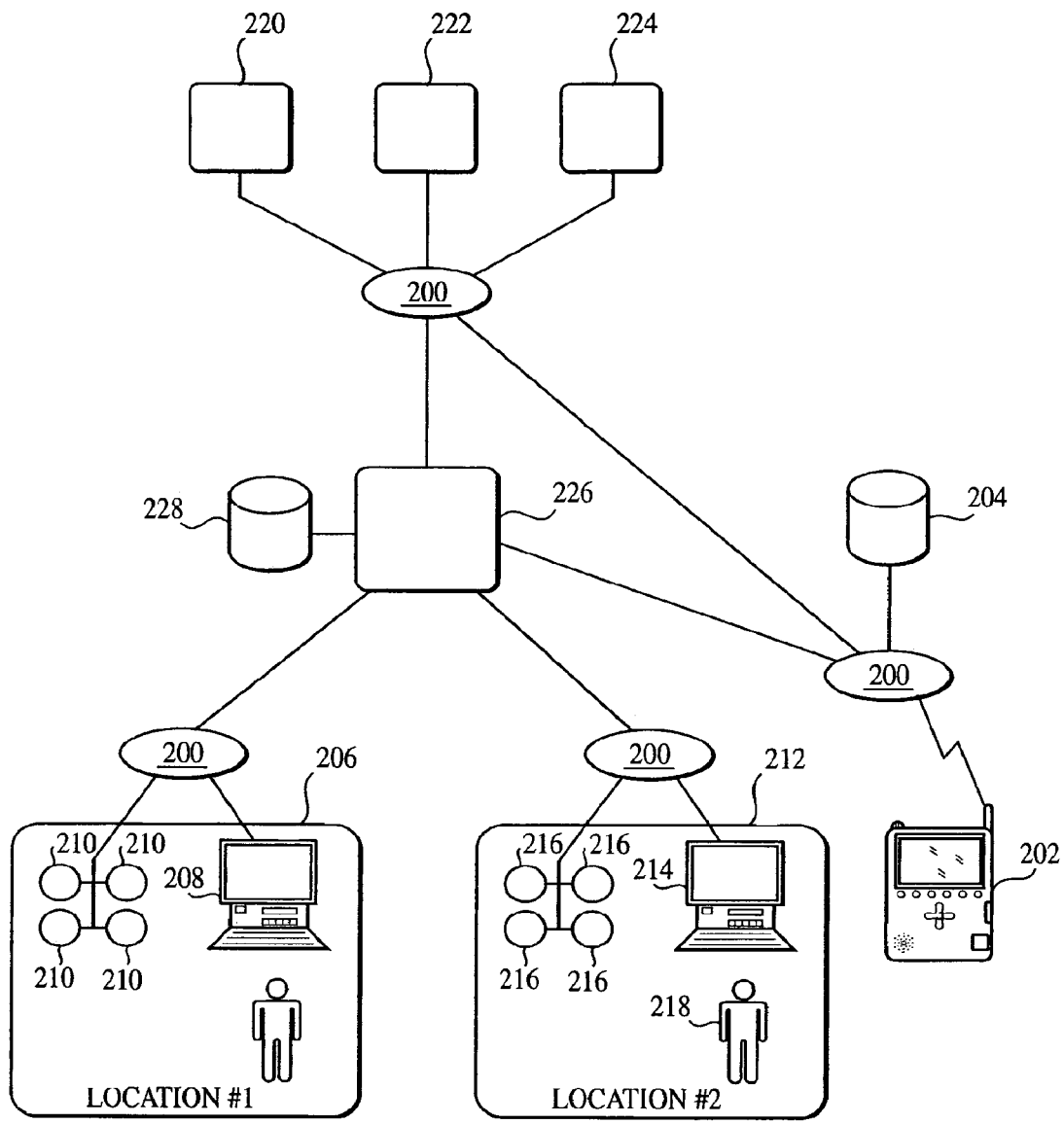
FIG. 13 is an illustration of a network system having a multitude of nodes corresponding to service providers, an aggregation server, databases, mobile device users and service channels, according to a preferred embodiment.

Referring now to FIG. 13, a system is illustrated for using a mobile device to provide enhanced delivery of services available at a location. The system includes a distributed publicly accessible network 200, such as the interne, providing a communications means for a plurality of hard-wired and wireless devices. A mobile device 202 contains a mobile node in communication with the network 200. The mobile device 202 is in communication with a user database 204 that stores the mobile device user's profile. The user database 204 may also store a number of other information and user applications such as calendars, e-mail, news lists, etc. Such information may alternatively be stored in a memory storage device in the mobile device, as illustrated in FIG. 1.

Different categories of information in the user profile may have different levels of privacy safeguards. For example, some information may be publicly accessible to all remote service providers, some information may be accessible only to the user's preferred remote service providers, other information may only be available to the aggregator server that manages access to the location service channels, other information may only be accessible to some or all of the local service providers, and yet other information may be accessible only to the user.

Location No. 1 (206), is a bank, and includes a local server 208 in communication with the network, and four service channels 210 in communication with the network. The service channels may be, for example, ATMS, computer kiosks, printers, Bank tellers, wall-mounted public multi-media station, etc. Location No. 2 (212), is a computer store, as described above, and includes a local server 214 in communication with internet 200. The store 212 also includes four service channels 216 in communication with the internet 200. The service channels may be wirelessly connected directly to the internet, or may be connected to the interne through the location-based server. The service channels may includes kiosks, printers, publicly available multimedia displays, mobile devices for store personnel, etc. The location servers 208 and 214 may also be local service providers. As such they need not be physically located within each location, and may be considered as a local service provider for all of the store locations operated by the local service provider.

Preferably, a number of remote service provider servers 220, 222 and 224 are in communication with the interne 200, and accessible by the mobile device. The remote service providers may be the manufacturers or sellers of equipment in the store 212. The remote service provider may be an interest rate quoting service that can provide competitive interest rate quotes, say for loans, while the mobile device user is in the bank 206. The remote service providers servers may access information in the user's profile database along with real-time or historical contextual information about the user to determine appropriate services to provide to the user either through the user interface on the mobile device service channel, or through a location service channel proximate to the user.

Each location and the service channels therein are in communication with an aggregation server 226. The aggregation server 226 maintains a registry of the locations 206 and 212, and the location service channels 210 and 216 located therein on a registry database 228. The aggregation server and associated database may be a system of distributed servers and databases.

The aggregation server may act as a central node managing the access to the location service channels. For example, each location service channel may have a unique IP address, and the aggregation server 220 routes the services provided from the remote service provider and redirects it to the selected location service channel appropriate to the type of service being provided and optimizations of matches between users and service providers.

The database 228 may also maintain a registry of remote service providers and mobile device users. The local service providers may provide preferences, rules and restrictions on how the location service channels contained in its stores are used for delivery of services to the mobile device users on its premises. For example, frequent customers, customers with strong interests in purchases, may have priority access to the location service channels compared with other customers. The local service providers may also maintain databases (not shown) such as CRM (customer relationship management) systems that includes profiles about users and remotes service providers that the aggregation server 226 may access, or have information transmitted from.

Likewise, the mobile device users may also have preferences, rules and restrictions stored on its profile data base 204 that is transmitted to the aggregation server 226. These may includes lists of preferred remote service providers, excluded service providers, providers for whom the user has pre-paid subscription with, and terms for one-time use payments the user is willing to make for other remote service providers.

Likewise, the remote service providers may have preferences, rules and restrictions as to how the services it presents to users is to be delivered on the location service channels. The remote service provider my also include terms for payment bids that it would make for priority access to the location service channels.

The aggregation server 226 balances the competing demands for services to be delivered on the location service channels, with the different rules, preferences and restrictions of the different parties having an interest in the service transaction. The database 228 is used to store this information. Because, the number of location service channels in a location is a scarce commodity, at times of high demand, the aggregation server 228 may use optimization algorithms, such as are known in the art, programmed on computer-readable medium to make the location service channel available to the highest bidder consistent with the preferences and restrictions imposed by the parties. The aggregation server may then communicate the payment terms and deposit account information, which are obtained from the parties' respective profile databases, to other payment servers that manage the monetary transactions associated with the particular match between the user and service provider and any commission or cut received by the local service provider.

The aggregation server 226 may maintain a cache in a memory storage device with a cue of mobile device users seeking services, and a cue of remote service providers willing to provide such services. The aggregations server may match up the remote service provider with the user based on mutual interests stored in the user profiles and the remote server profiles. The mutual interest may include the amount of money the user is willing to pay and the remote service provider is willing to receive for providing services of interest to the user. The mutual interest may be an exchange of money in the other direction if the service provided will encourage the user to make a purchase of products made by the remotes service provider and for sale at the location, or vice versa. Still, the proprietor of the aggregation server may obtain the monetary benefit from the remote service provider as the agent of the remote service provider to "find" an appropriate user to receive its services. The cache may also hold cues of matched service providers and users waiting for service channels to become available.

The aggregation server 226 may also maintain a database of page views and interactions of users with service providers at specific locations. In conjunction with the location service providers reporting the user's transactions with the local service providers' locations, the aggregation server may track a user's purchase on an item at one location with a prior service received at another location. The aggregation server may then request a commission from the later local service provider where the item was purchased to be paid to the prior local service provider allowed access to its location service channels. The desire for this arrangement is to encourage locations to invest in the infrastructure for the location service channels if they can see a revenue stream generated even though the user decides to purchase the products else where after receiving services at the prior location.

From the foregoing description, one skilled in the art may appreciate that the invention make take a variety of forms and may be performed in a variety of sequence by a variety of providers. For example, in another more generic sequence, one embodiment of the invention may occur as follows: determine location of mobile device, present location-specific menu of services on mobile device, user selects service, present service on mobile device, access user profile, identify available location service channels, select one or more available service channel, shift service to selected location service channel, request additional services through mobile device, present additional services on location service channel, access user profile, determine appropriate ancillary services, prompt location service provider to provide ancillary services, location-based staff present ancillary service to user, staff input information into second mobile device, access user profile, complete transaction, location-based server terminates location service channel session to make available to second user.

Thus, there has been disclosed in accordance with the invention, methods, systems and apparatus for delivering location-based services to a user within a given geographical location that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

What is claimed is:

1. A product comprising:

a memory;

instructions stored in the memory that, when executed, cause a computer processor to:

determine a current location of a mobile device;

determine whether the current location falls within one or more geographic regions defined in a database; and based on a determination that the current location falls within one or more of the geographic regions:

identify services available within the one or more geographic regions that the current location of the mobile device is determined to be within;

determine a prioritization of the identified services based on a first criteria;

select a subset of the identified services based on the prioritization;

generate a customized menu based on the selected subset of identified services; and display the customized menu on the mobile device.

2. The product of claim 1, wherein the instructions stored in the memory further cause the computer processor to continuously determine whether the current location of the mobile device has changed to a new current location.

3. The product of claim 2, wherein the instructions stored on the memory, when executed, further cause the processor to:
identify whether the new current location is a geographic region that is a sub-region within a larger geographic region that has previously been identified and a customized menu provided; and
update the customized menu based on the services available with the identified sub-region.

4. The product of claim 2, wherein, based on a determination that the current location of the mobile device has changed to a new current location, the instructions stored in the memory further cause the computer processor to:
determine whether the new current location falls within one or more of the geographic regions defined in the database; and
based on a determination that the new current location falls within one or more of the geographic regions:
identify services available within the one or more geographic regions that the new current location of the mobile device is determined to be within;
update the customized menu based on the identified services available within the one or more geographic regions that the new current location of the mobile device is determined to be within; and
display the updated customized menu on the mobile device.

5. The product of claim 1, wherein the instructions stored in the memory further cause the processor to:
identify service providers of the identified services.

6. A system for providing location-based services, comprising:
a computer processor;
a memory in communication with the computer processor, the memory comprising:
instructions that, when executed, cause the computer processor to:
determine a current location of a mobile device;
determine whether the current location falls within one or more geographic regions defined in a database; and
based on a determination that the current location falls within one or more of the geographic regions:
identify services available within the one or more geographic regions that the current location of the mobile device is determined to be within;
determine a prioritization of the identified services based on a first criteria;
select a subset of the identified services based on the prioritization;
generate a customized menu based on the selected subset of identified services; and
display the customized menu on the mobile device.

7. The system of claim 6, wherein the instructions further cause the computer processor to continuously determine whether the current location of the mobile device has changed to a new current location.

8. The system of claim 7, wherein the instructions stored on the memory, when executed, further cause the processor to:
identify whether the new current location is a geographic region that is a sub-region within a larger geographic region that has previously been identified and a customized menu provided; and
update the customized menu based on the services available with the identified sub-region.

9. The system of claim 7, wherein, based on a determination that the current location of the mobile device has changed to a new current location, the instructions further cause the computer processor to:
determine whether the new current location falls within one or more of the geographic regions defined in the database; and
based on a determination that the new current location falls within one or more of the geographic regions:
identify services available within the one or more geographic regions that the new current location of the mobile device is determined to be within;
update the customized menu based on the identified services available within the one or more geographic regions that the new current location of the mobile device is determined to be within; and
display the updated customized menu on the mobile device.

10. The system of claim 6, wherein the instructions further cause the processor to:
identify service providers of the identified services.

11. A method for providing location-based services, comprising:
determining a current location of a mobile device;
determining, using at least one computer processor, whether the current location falls within one or more geographic regions defined in a database; and
based on a determination that the current location falls within one or more of the geographic regions:
identifying, using the at least one computer processor, services available within the one or more geographic regions that the current location of the mobile device is determined to be within;
determining a prioritization of the identified services based on a first criteria; and
selecting a subset of the identified services based on the prioritization;
generating, using the at least one computer processor, a customized menu based on the selected subset of identified services; and
displaying the customized menu on the mobile device.

12. The method of claim 11, further comprising continuously determining whether the current location of the mobile device has changed to a new current location.

13. The method of claim 12, further comprising:
identifying whether the new current location is a geographic region that is a sub-region within a larger geographic region that has previously been identified and a customized menu provided; and
updating the customized menu based on the services available with the identified sub-region.

14. The method of claim 12, further comprising, based on a determination that the current location of the mobile device has changed to a new current location:
determining whether the new current location falls within one or more of the geographic regions defined in the database; and
based on a determination that the new current location falls within one or more of the geographic regions:
identifying services available within the one or more geographic regions that the new current location of the mobile device is determined to be within;
updating the customized menu based on the identified services available within the one or more geographic regions that the new current location of the mobile device is determined to be within; and displaying the updated customized menu on the mobile device.

15. The method of claim 11, further comprising:
identifying service providers of the identified services.

16. A product comprising:
a memory;
instructions stored in the memory that, when executed, cause a computer processor to:
determine a current location of a mobile device;
determine whether the current location falls within one or more geographic regions defined in a database;
based on a determination that the current location falls within one or more of the geographic regions:
identify a first set of services available within the one or more geographic regions that the current location of the mobile device is determined to be within;
determine a prioritization of the identified first set of services based on a first criteria;
select a subset of the identified first set of services based on the prioritization;
generate a customized menu based on the selected subset of the identified first set of services; and
display the customized menu on the mobile device;
continuously determine whether the current location of the mobile device has changed to a new current location; and
based on a determination that the current location of the mobile device has changed to a new current location:
determine whether the new current location falls within one or more of the geographic regions defined in the database;
based on a determination that the new current location falls within one or more of the geographic regions:
identify a second set of services available within the one or more geographic regions that the new current location of the mobile device is determined to be within;
determine a prioritization of the identified second set of services based on the first criteria;
select a subset of the identified second set of services based on the prioritization;
update the customized menu based on the selected subset of the identified second set of services; and
display the updated customized menu on the mobile device.

17. The product of claim 16, wherein the memory further comprises instructions stored thereon that, when executed, cause the processor to:
identify whether the new current location is a geographic region that is a sub-region within a larger geographic region that has previously been identified and a customized menu provided; and
update the customized menu based on the services available with the identified sub-region.

18. The product of claim 16, wherein the memory further comprises instructions stored thereon that, when executed, cause the processor to:
retrieve a profile of a user of the mobile device, and
select a customized menu based further on the retrieved user profile.

19. The product of claim 18, wherein the memory further comprises instructions stored thereon that, when executed, cause the processor to:
establish a task of the user based on the user's current location and the user profile; and display a list of available services on the user interface relevant to the established task.

20. The product of claim 16, wherein the memory further comprises instructions stored thereon that, when executed, cause the processor to:
identify the providers of the services available in the first set of services.

* * * * *